(12) United States Patent
Mulholland et al.

(10) Patent No.: US 8,881,349 B2
(45) Date of Patent: Nov. 11, 2014

(54) ADJUSTABLE HOLDING DEVICE AND ASSOCIATED ADJUSTABLE CONNECTION MECHANISM

(76) Inventors: Menno Mulholland, Vancouver (CA); Matt Hunsberger, Vancouver (CA)

( * ) Notice: Subject to any disclaimer, the term of this patent is extended or adjusted under 35 U.S.C. 154(b) by 61 days.

(21) Appl. No.: 13/340,894

(22) Filed: Dec. 30, 2011

(65) Prior Publication Data

US 2012/0311824 A1 Dec. 13, 2012

Related U.S. Application Data

(60) Provisional application No. 61/495,297, filed on Jun. 9, 2011.

(51) Int. Cl.
| | | |
|---|---|---|
| B65D 63/16 | (2006.01) | |
| F16G 11/00 | (2006.01) | |
| F16G 11/10 | (2006.01) | |
| F16G 11/14 | (2006.01) | |

(52) U.S. Cl.
CPC ............ *F16G 11/106* (2013.01); *F16G 11/143* (2013.01)
USPC ........... 24/301; 24/68 CD; 24/265 H; 24/300; 24/348

(58) Field of Classification Search
CPC .............................. F16G 11/106; F16G 11/143
USPC ....... 24/130, 132 R, 134 KA, 134 KB, 134 L, 24/134 N, 134 R, 300, 301, 68 CD, 170, 24/192, 265 BC, 265 EC, 265 H, 302, 318, 24/348
See application file for complete search history.

(56) References Cited

U.S. PATENT DOCUMENTS

| | | | | |
|---|---|---|---|---|
| 3,099,055 | A | * | 7/1963 | Huber ........................... 410/103 |
| 3,628,221 | A | * | 12/1971 | Pasbrig ........................... 403/18 |
| 3,953,911 | A | | 5/1976 | Fishack |
| D282,904 | S | | 3/1986 | Faidide |
| 4,716,630 | A | * | 1/1988 | Skyba ......................... 24/134 R |
| 4,878,270 | A | * | 11/1989 | Westerkamp ............... 24/132 R |
| D307,705 | S | | 5/1990 | Mair |
| 5,271,127 | A | * | 12/1993 | Christensen .................. 24/16 R |
| 5,383,259 | A | | 1/1995 | McIntire |
| 5,423,644 | A | * | 6/1995 | First, Sr. ....................... 410/100 |
| D370,406 | S | | 6/1996 | Tsai |
| 5,623,750 | A | * | 4/1997 | Nasin et al. ................. 24/68 CD |
| 5,809,620 | A | * | 9/1998 | Crowley et al. .................. 24/302 |
| D407,297 | S | | 3/1999 | Mihailovic-Wichard |
| 5,937,490 | A | | 8/1999 | Mihailovic |
| 5,987,707 | A | | 11/1999 | DeShon |
| 6,012,204 | A | * | 1/2000 | Roethler ..................... 24/129 R |
| 6,049,950 | A | | 4/2000 | Cavallo |
| 6,094,784 | A | * | 8/2000 | Schrader .................. 24/265 CD |
| 6,292,984 | B1 | | 9/2001 | Nelson |

(Continued)

*Primary Examiner* — Robert J Sandy
*Assistant Examiner* — Louis Mercado
(74) *Attorney, Agent, or Firm* — Todd L. Juneau

(57) ABSTRACT

The adjustable holding device includes an elongate cord which may be elastomeric. The holding device has a first connection mechanism that is operatively connected to the elongate cord. In addition, an adjustable connection mechanism is also operatively connected to the elongate cord and configured to be movable along the length of the cord. The adjustable connection mechanism includes a cam system configured to engage the elongate cord at a desired location. In addition, the adjustable connection mechanism is configured to move along the elongate cord when the first connection mechanism and the adjustable connection mechanism are operatively connected to desired connection points.

13 Claims, 12 Drawing Sheets

(56) References Cited

U.S. PATENT DOCUMENTS

| | | |
|---|---|---|
| D468,997 S | 1/2003 | Chang |
| 6,851,163 B2 | 2/2005 | Selby |
| D538,138 S | 3/2007 | Knight |
| D577,574 S | 9/2008 | Liang |
| 7,428,769 B2 * | 9/2008 | Fontaine et al. ................ 24/130 |
| D591,584 S | 5/2009 | Kelleghan |
| D595,119 S | 6/2009 | Kelleghan |
| D609,078 S | 2/2010 | Kelleghan |
| 8,079,116 B2 * | 12/2011 | Ayers et al. ................ 24/68 CD |
| D655,999 S | 3/2012 | Kelleghan |
| 8,141,212 B2 * | 3/2012 | Fontaine et al. ................ 24/130 |
| 2006/0085956 A1 | 4/2006 | Stevens |
| 2008/0307612 A1 * | 12/2008 | Fontaine et al. ................ 24/130 |
| 2009/0119891 A1 | 5/2009 | Leung |
| 2011/0005041 A1 | 1/2011 | Gangakhedkar et al. |
| 2011/0225779 A1 * | 9/2011 | Jones ................ 24/301 |
| 2012/0000043 A1 * | 1/2012 | Maire ................ 24/68 CD |
| 2013/0091673 A1 * | 4/2013 | Raymond ................ 24/68 CD |

* cited by examiner

ADJUSTABLE HOLDING DEVICE AND ASSOCIATED ADJUSTABLE CONNECTION MECHANISM

CROSS REFERENCE TO RELATED APPLICATIONS

This application claims the benefit and priority of U.S. Provisional Application 61/495,297, filed Jun. 9, 2011. The foregoing application is incorporated by reference herein in its entirety.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

FIELD OF THE INVENTION

The present technology pertains to the field of holding devices, for example, cable tie systems and in particular to holding devices that are adjustable.

BACKGROUND

Those skilled in the art will appreciate that a wide variety of load-support and/or securement or tie-down systems have been employed for many years. Bungee cords are well known and have been used as a fastening means, among other things, for a long time. However, such well known bungee cords have all previously had nonadjustable defined lengths. Although these cords are known to be highly elastic (varying with the type of material used), the maximum length to which these cords can be stretched is limited by the elasticity of the cords' material. In other words, prior bungee cords only stretch as much as the material's elasticity will allow, and the cords do not offer any flexibility or adjustability beyond this maximum length. Therefore, these cords cannot be adjusted to, on one occasion, mount or secure an object or objects of a first size and shape, then, on another occasion, mount or secure different objects having a much larger or much smaller size. In the past, multiple cords needed to be "linked" (often unsafely) together to accomplish this, and/or many cords having a variety of lengths were needed in order to meet these ever changing length requirements.

The common end configuration for a bungee cord merely folds the end on itself and is held in place by a thick stiff wire clip. This folded shock cord end acts as a stop for a wire bale with a hook. The wire bale is usually tightly wound wire forming a sleeve through which the shock cord freely passes. The wire at the end of the wire bale is bent into a hook shape to make it easy to secure. The wire bale slide over the normally relaxed bungee cord until the bale meets the folded end. Because the folded end is larger in diameter than the wire bale sleeve, the folded end acts a stop for the free movement of the bale. The wire clip holding the end of the cord folded on itself is strong and creates a nearly permanent stop at the end of the cord. The wire clips holding the shock cord ends folded are difficult to install or replace. Therefore once a bungee cord length has been chosen and the cord ends have been folded and secured with wire clips, the usable range of the bungee cord is permanently set.

Typically, to use the bungee cord, one end is secured, the cord is stretched, and then the other end is secured. When the tension of the cord is wrong, its points of attachment must be changed to accommodate the existing cord length or a bungee cord of a different length must be used. The core of bungee cords is an elastomeric substance. Elastomeric substances breakdown with time and exposure to the environment. A new bungee cord that may have good tension for a particular application when new, will lose tension over time and may become unacceptable. The cord will then have to be replaced with another one having the desired tension. Some prior art, has also provided means by which the length of this cord can be adjusted.

For example U.S. Pat. No. 5,383,259 discloses an apparatus having a collet piece in a casing for attaching to a shock cord (or rubber or rubber composite cord or strap) anywhere along the length of the cord. The substantial change in width of a circular or flat shock cord as it is stretched is used to make the width of the cord narrow. When the cord is narrow it freely moves through a passage in the collet piece unit. When the cord is released to its fully relaxed width, the cord's width is wider than the greatest width of the passage through the collet piece and casing unit. The compression on the cord creates a frictional holding force between the collet piece, casing unit, and the shock cord. A tapered opening is provided in the casing so that when the cord is pulled in one direction while the casing is held, the frictional force causes the collet piece to slide along the tapered opening thereby reducing the width of the passage through the collet piece and casing unit to grip and hold the shock cord in the passage. The gripping width automatically follows the decreasing width of the shock cord as it is stretched with increasing force. The gripping force being limited by controlling the minimum width of the passage through the collet piece and casing according to the minimum width tolerable by the shock cord to be used. A hook or other connecting device can be attached to or can be integral with the casing to secure an end or an intermediate point along a shock cord. While this tie down system or cable tie system is adjustable, it may require several adjustments to the effective length thereof until a desired length of the tie down system is achieved.

In addition, U.S. Pat. No. 6,049,950 discloses an adjustable bungee cord device for fastening, securing or mounting objects together or to a stationary object. The device comprises at least two sections of conventional bungee cord, each having a means for attaching the cord sections to each other or to some stationary object, such as metal hooks. One of the cord sections is firmly attached to a locking mechanism via a roll pin positioned near the middle of the locking mechanism. This cord section extends from the locking mechanism through a slot which runs from the roll pin to the edge of the locking mechanism. The other cord section is slidably engaged with the locking mechanism via a slot which extends completely from one end of the locking mechanism to the other. The locking mechanism further comprises a latch hook comprising a lip for securing it in the closed position, a pin hole for rotatably attaching it to the locking mechanism, and a serrated edge for gripping the cord section when the latch hook is in its closed position. To adjust the length, the user opens the latch hook, slides the cord section to the desired position, and closes the latch hook. As with the previous tie down system or cable tie system, it may require several adjustments to the effective length thereof until a desired length of the tie down system is achieved.

U.S. Pat. No. 6,292,984 discloses a load-support system for supporting a load employing an instantaneously adjustable hook which is freely slideable along a tie-down or load-support cord to any selected operative position where the hook is positively latched to the cord by turning or twisting the hook relative to the cord to a position wherein the inboard end of the cord exiting from the hook is disposed at an acute included angle relative to the longitudinal axis of the bore in the hook through which the cord extends. Such twisting or turning action serves to bias a latching element in the hook into latched engagement with the cord, preventing loosening—i.e., decrease in tension—of the effective length of the cord yet, at the same time, permitting movement of the cord through the hook in the opposite direction to increase the tension on the effective length of the cord while the hook remains positively latched thereto. Again, while this tie down system or cable tie system is adjustable, it may require several adjustments to the effective length thereof until a desired length of the tie down system is achieved.

Therefore there is a need for new cable tie system which overcomes one or more of the problems in the prior art.

This background information is provided to reveal information believed by the applicant to be of possible relevance to the present technology. No admission is necessarily intended, nor should be construed, that any of the preceding information constitutes prior art against the present technology.

SUMMARY OF THE INVENTION

An object of the present technology is to provide an adjustable holding device and associated adjustable connection mechanism. In accordance with an aspect of the present technology, there is provided an adjustable holding device comprising: an elongate cord having a length; a first connection mechanism operative with the elongate cord; and an adjustable connection mechanism operatively connected to the elongate cord and movable along the length of the cord, the adjustable connection mechanism including a cam system configured to engage the elongate cord at a desired location, wherein the adjustable connection mechanism is configured to move along the elongate cord when said first connection mechanism and adjustable connection mechanism are operatively connected to desired connection points.

In accordance with another aspect of the present technology, there is provided a kit comprising the adjustable holding device as described above and instructions for its use.

In accordance with another aspect of the present technology, there is provided an adjustable connection mechanism for use with an elongate cord, the connection mechanism comprising: a channel for receiving a section of the elongate cord; a cam system disposed within the channel and shiftable between an engaged position and a disengaged position, wherein the cam system is configured to grippingly engage the section of the elongate cord when in the engaged position, and wherein the elongate cord is moveable along a length thereof through the channel when the cam system is in the disengaged position; a connection device configured for operatively connecting the connection mechanism to a desired connection point; and an actuation mechanism operatively coupled to the cam system and configured for shifting the cam system between the disengaged position and the engaged position when the connection mechanism is operatively connected to the desired connection point.

DETAILED DESCRIPTION OF THE INVENTION

Definitions

Figure 1:
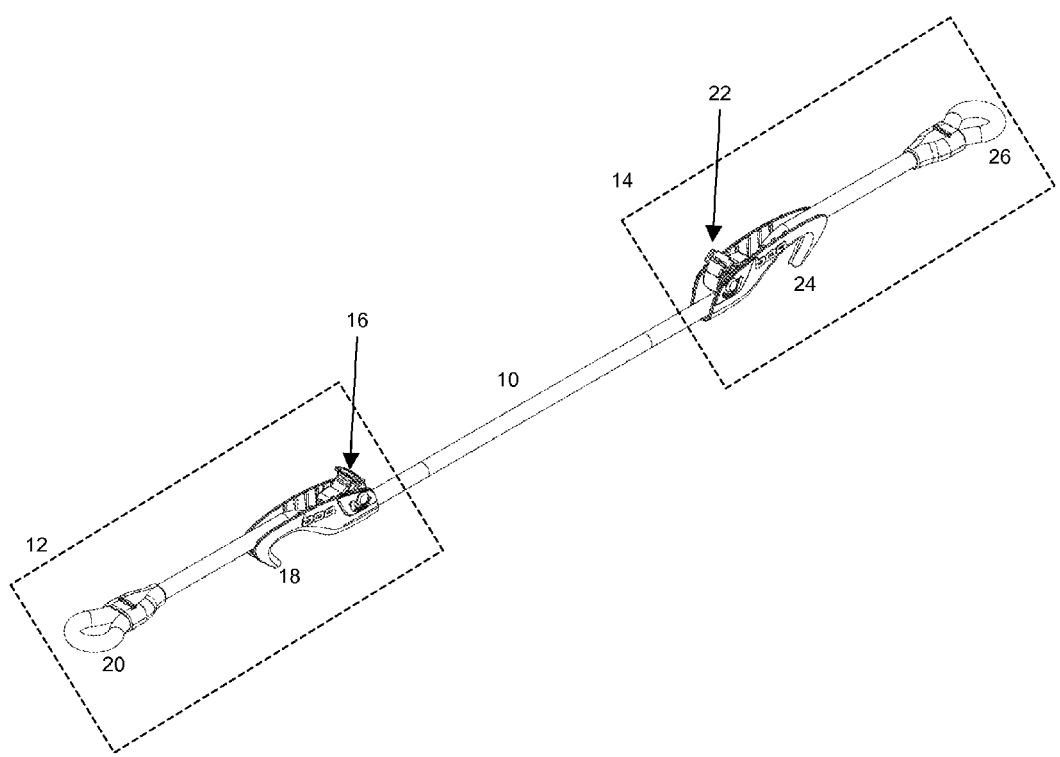
FIG. 1 illustrates a perspective view of an adjustable holding device in accordance with embodiments of the present technology.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

Embodiments of the present technology provide an adjustable holding device comprising an elongate cord which has a length. The holding device further comprises a first connection mechanism that is operative with the elongate cord. The first connection mechanism may be a hook type connection device, a loop type connection, or it may be a section of cord configurable as a knot, or the like. In addition, an adjustable connection mechanism is also operatively connected to the elongate cord and configured to be movable along the length of the cord. The adjustable connection mechanism includes a cam system configured to engage the elongate cord at a desired location. In addition, the adjustable connection mechanism is configured to move along the elongate cord when the first connection mechanism and the adjustable connection mechanism are operatively connected to desired connection points. In this manner the adjustable holding device can provide for the adjustability of the holding device while the device is engaged with the desired connection points. The elongate cord may be an elongate elastomeric cord, for example a shock cord, a rope type elongate cord or the like, which can be determined based on the intended use of the adjustable holding device. The elongate cord may have a substantially circular or otherwise-shaped cross section.

Embodiments of the present technology provide a kit comprising the adjustable holding device as described above and instructions for its use. The instructions may comprise various aspects. For example, the instructions may contain specifications relating to the maximum tensile strength of the cord and/or the maximum tension in the cord at which the cam system disengages. The instructions may contain instructions for moving the adjustable connection mechanism along the cord and/or one or more ways of tightening the holding device to a desired tension.

Embodiments of the present technology provide an adjustable connection mechanism for use with an elongate cord. Such an adjustable connection mechanism may be used as the adjustable connection mechanism of the above-described adjustable holding device, and optionally also the first connection mechanism. The connection mechanism may comprise a substantially unitary body. The connection mechanism comprises a channel for receiving a section of the elongate cord. The connection mechanism comprises a cam system disposed within the channel and shiftable between an engaged position and a disengaged position. The cam system is configured to grippingly engage the section of the elongate cord when in the engaged position. The elongate cord is moveable along a length thereof through the channel when the cam system is in the disengaged position. The connection mechanism comprises a connection device, such as a hook, configured for operatively connecting the connection mechanism to a desired connection point. The connection mechanism comprises an actuation mechanism operatively coupled to the cam system and configured for shifting the cam system between the disengaged position and the engaged position when the connection mechanism is operatively connected to the desired connection point. The actuation mechanism may comprise a manual and/or automatic release mechanism, a safety mechanism, a mechanism configured to limit rotation of the cam, a biasing means, or the like, or a combination thereof, all as described herein. Manual means of the actuation mechanism may be in the form of a pushbutton, lever, depression point, latch engagement/disengagement mechanism, or the like. In some embodiments, the actuation mechanism is configured to shift the cam system between the engaged and disengaged positions while substantially maintaining a relative orientation of the elongate cord and the connection mechanism. Thus, the cam system may be engaged and/or disengaged without requiring disconnection from the connection point, twisting or turning of the connection mechanism, cord, or both, or the like.

According to some embodiments, the first connection mechanism or the adjustable connection mechanism or both, include a hook type connection device. The hook type connection device can be configured such that it is capable of coupling to a variety of different formats of desired connections points.

According to some embodiments, the first connection mechanism or the adjustable connection mechanism or both, comprise a combination of a hook type connection device and a loop type connection. A hook type connection device and a loop type connection can be cooperatively used to connect an end of the adjustable holding device to a desired connection point. For example, by coupling the hook type connection device with the loop type connection, a retention loop can be created which can loop around, through or otherwise engage with a desired connection point.

According to some embodiments, the first connection mechanism or the adjustable connection mechanism is a loop type connection. In this configuration, a desired connection point can include a form of a loop retention system, for example a hook type connection, thereby enabling a connection between the first or adjustable connection mechanism and the desired connection point to be made.

According to some embodiments, the first connection mechanism includes a cam system configured to engage the elongate cord at a desired location, wherein the first connection mechanism is configured to move along the elongate cord when the first connection mechanism and the adjustable connection mechanism are operatively connected to desired connection points.

According to some embodiments, the cam system associated with the first connection mechanism, the adjustable connection mechanism or both, is configured for releasable engagement of the elongate cord. For example, upon the activation of a release mechanism, the cam system is biased into a disengaged configuration, wherein the cam system and the elongate cord not engaged. In some embodiments, regardless of whether a biasing means is included or not, the cord is movable along its length in either direction when the cam system is disengaged.

According to some embodiments, the cam system associated with the first connection mechanism, the adjustable connection mechanism or both, is configured to be biased into engagement with the elongate cord. For example, a biasing mechanism, for example a spring, can be configured to bias the cam system into an engaged configuration, wherein the cam system and the elongate cord are engaged. In some embodiments, regardless of whether a biasing mechanism is included or not, the cord is movable along its length in either direction when the cam system is disengaged.

According to some embodiments, when the elongate cord is elastomeric, the cam system associated with the first connection mechanism, the adjustable connection mechanism or both, comprises a safety mechanism that is configured to limit tensile loading applied to the elongate elastomeric cord during use. For example, the cam system is configured to discontinue engagement of the elongate elastomeric cord when a reduction in the cross sectional size of the cord has reached a predetermined limit, wherein this cross sectional size reduction is at least in part indicative a desired limit of the tensile load. In some embodiments, the cam system may be configured to commence engaging or re-engaging the elongate elastomeric cord as the cross sectional size of the cord reaches a predetermined re-engagement threshold size from below. The cam system may arrest elastic retraction of the cord at or after such engagement or re-engagement, thereby holding the cord under tensile load.

According to some embodiments, the cam system associated with the first connection mechanism, the adjustable connection mechanism or both, is configured to provide a means for a user of the adjustable holding device to enhance or manually trigger the disengagement of the elongate cord by the cam system. For example, the cam system can comprise a depression location which provides a location for the application of pressure by the user for enhancing the disengagement of the elongate cord by the cam system.

FIG. 1 illustrates a perspective view of an adjustable holding device in accordance with embodiments of the present technology. The device includes an elongate cord 10 with which a first connection mechanism 12 and an adjustable connection mechanism 14 are operatively connected. In this embodiment, the first connection mechanism and the adjustable connection mechanism are of the same configuration, however in some embodiments the connection mechanisms can have different configurations. As illustrated in FIG. 1, the first and adjustable connection mechanisms include a cam system 16 and 22, which are configured to engage the elongate cord 10. These connection mechanisms each further include a hook type feature 24 and 18, which can be used to directly or indirectly connect to desired connection points. In this example, each connection mechanism further includes a loop type connection 20 and 26, each of which may provide an alternate means for connection to a desired connection point. In some embodiments a loop type connection, for example 26 can mate with a proximate hook type feature 24, to cooperatively engage a desired connection point. As would be readily apparent to a worker skilled in the art, at least one of the connection mechanisms of the adjustable holding device is directly or indirectly engaged with a desired connection point, thereby providing a means for the adjustment of the relative holding force applied by the adjustable holding device upon the object being retained or otherwise held.

Figure 2:
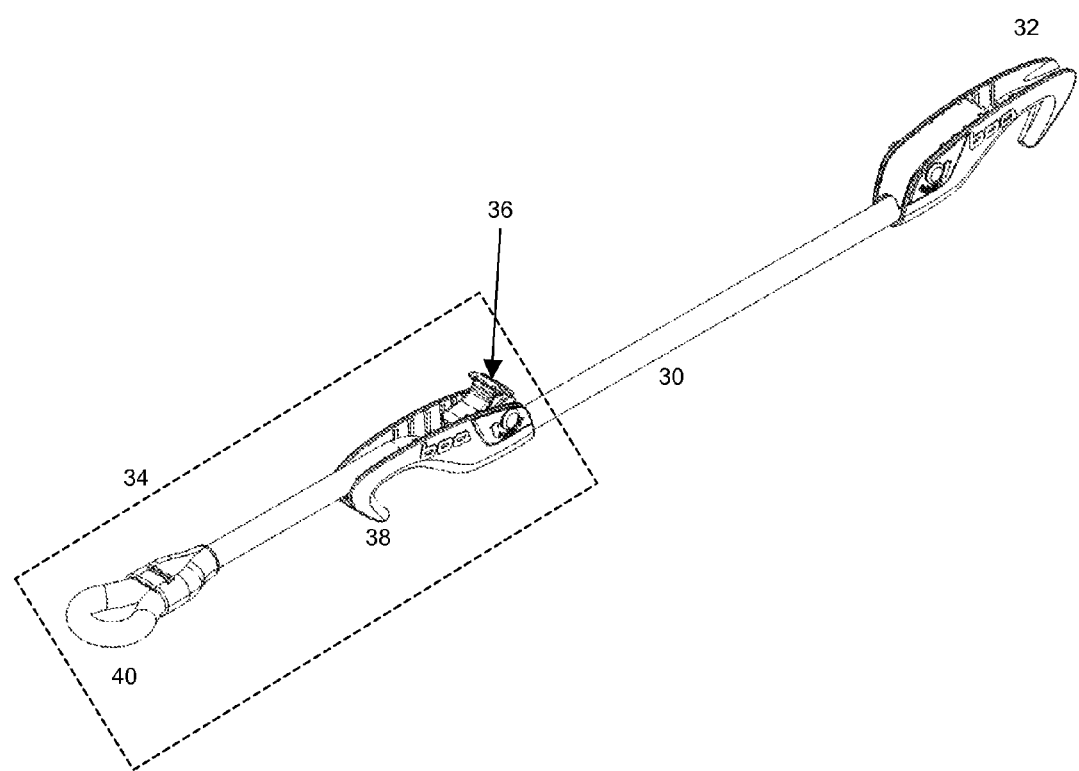
FIG. 2 illustrates a perspective view of an adjustable holding device in accordance with embodiments of the present technology.

FIG. 2 illustrates a perspective view of an adjustable holding device in accordance with embodiments of the present technology. The device includes an elongate cord 30 with which a first connection mechanism 32 and an adjustable connection mechanism 34 are operatively connected. As illustrated in FIG. 2, the adjustable connection mechanism 34 includes a cam system 36, which is configured to engage the elongate cord 30. The adjustable connection mechanism 34 further includes a hook type feature 38, which can be used to directly or indirectly connect to desired connection points. In this example, the adjustable connection mechanism further includes a loop type connection 40, which may provide an alternate means for connection to a desired connection point. In some embodiments a loop type connection 40 can mate with the hook type feature 38, to cooperatively engage a desired connection point. As illustrated in FIG. 2, the adjustable holding device further comprises a first connection mechanism 32, which in this embodiment is configured as a hook type feature 32 which can be used to couple the adjustable holding device to a desired connection point.

Elongate Cord

The elongate cord is configured to cooperatively engage with the first connection mechanism and the adjustable connection mechanism and has a length which can span a desired region, around a particular object for holding or the like.

In some embodiments, the elongate cord is elastomeric. The cord may have an elastic quality, wherein after the introduction of a tensile force into the cord the cord elongates, wherein upon release of this tensile force, the cord returns to substantially it original, at rest, length.

The cord may have a substantially circular or oval-shaped cross section, for example as in a shock cord. A circular cross section may allow for relatively uninhibited rotation of the connection mechanisms movably engaged with the cord. An oval-shaped cross section may be used if it is desired to inhibit rotation of these connection mechanisms. Polygonal or otherwise shaped cross sections may also be used. In embodiments of the present invention, the cord cross section has a height which is no less than 50%, 75% or 90% of its width.

The cord can be manufactured from a variety of different materials or combinations of materials, wherein the materials are selected for a desired level of elasticity, tensile strength, potential durability and the like, or combinations thereof. The selection of the material for the cord can further be dependent on intended uses for the adjustable holding device. In some embodiments, the cord is manufactured from a polymer or rubber type material, or other elastomeric type of material as would be readily understood by a worker skilled in the art.

In some embodiments, the cord is formed from a single strand of elastomeric material and in some embodiments the cord is manufactured from a plurality of elastomeric material strands, the interconnection of which provides the cord with the desired strength and elastic qualities. As would be readily understood by a worker skilled in the art, there are a plurality of different configurations for an elastomeric cord, each of which may be suitable for the cord of the adjustable holding device of the present technology, provided that the configuration selected meets a desired set of criteria for the cord, for example, strength, elasticity, tensile force capacity and the like.

In some embodiments, the cord includes a sheath, wherein the sheath covers the elastomeric material, for example to provide a desired level of protection. As would be readily understood, a sheath for use with the cord, should be manufactured such that is has the ability to elongate relative to the elongation or the elastomeric material. For example, the sheath can be a material that is adhered to the elastomeric material for protection thereof. In some embodiments, the sheath can be a type of woven material, wherein the weave at least in part provides a means for the elongation of the sheath.

In some embodiments, the sheath thickness is configured relative to the teeth or spines of the cam system, such that the teeth or spines substantially engage the sheath without penetrating fully through the sheath and into the elastomeric material. This may prolong the cord life by protecting the elastomeric material from repeated puncturing and tension applied by the puncturing teeth.

In some embodiments, the sheath thickness is configured relative to the teeth or spines of the cam system, such that the teeth or spines penetrate fully through the sheath and into the elastomeric material. This may enhance retention by the cam system since the elastomeric material may be less susceptible to slippage than the sheath.

In some embodiments, the elongate cord is substantially non-elastomeric or of limited elasticity. For example, the cord may be a sheathed or unsheathed cord having a substantially circular, oval, or otherwise shaped cross section. In embodiments of the present technology, the non-elastomeric cord cross section has a height which is no less than 50%, 75% or 90% of its width, thereby differentiating the cord from a substantially flat strap. A non-elastomeric cord or cord of limited elasticity may be a rope made of twisted or braided fibres, a cord of unitary, flexible, substantially non-elastic material such as nylon, or another type of cord as would be readily understood to a worker skilled in the art.

Connection Mechanism

The adjustable holding device comprises two connection mechanisms, each of which are operatively connected to the elongate cord and provide a means for connection to desired connection points during operation of the adjustable holding device. In addition, at least one of the connection mechanisms is both operatively connected to the elongate cord and configured to be movable along the length of the cord. This connection mechanism includes a cam system configured to engage the elongate cord at a desired location, thereby enabling the adjustment of the effective length of the elongate cord.

According to embodiments, the cam system is configured to allow movement of the connection mechanism along the length of the elongate cord in a first direction, while the cam system rotates into an engaging configuration when the connection mechanism attempts to travel along the elongate cord in the opposite direction.

According to some embodiments, both connection mechanisms include a cam system configured to engage the elongate cord at respective desired locations, wherein both connection mechanisms are configured to move along the elongate cord when the first and adjustable connection mechanisms are operatively connected to desired connection points.

According to some embodiments, the cam system associated with the first connection mechanism, the adjustable connection mechanism or both, is configured for releasable engagement of the elongate cord. For example, upon the activation of a release mechanism, the cam system is biased into an unengaged configuration, wherein the cam system and the elongate cord are not engaged. In embodiments wherein the cord is elastomeric, an automatic release or de-tensioning mechanism may be provided, optionally in addition to a manual release mechanism.

According to some embodiments, the first connection mechanism, adjustable connection mechanism or both include a hook type connection device. The hook type connection can be configured such that it is capable of coupling to a variety of different formats of desired connections points.

According to some embodiments, the first connection mechanism or the adjustable connection mechanism or both, comprise a combination of a hook type connection and a loop type connection. A hook type connection and a loop type connection can be cooperatively used to connect an end of the adjustable holding device to a desired connection point. For example, by coupling the hook type mechanism with the loop type connection, a retention loop can be created which can loop around, through or otherwise engage with a desired connection point.

Figure 3:
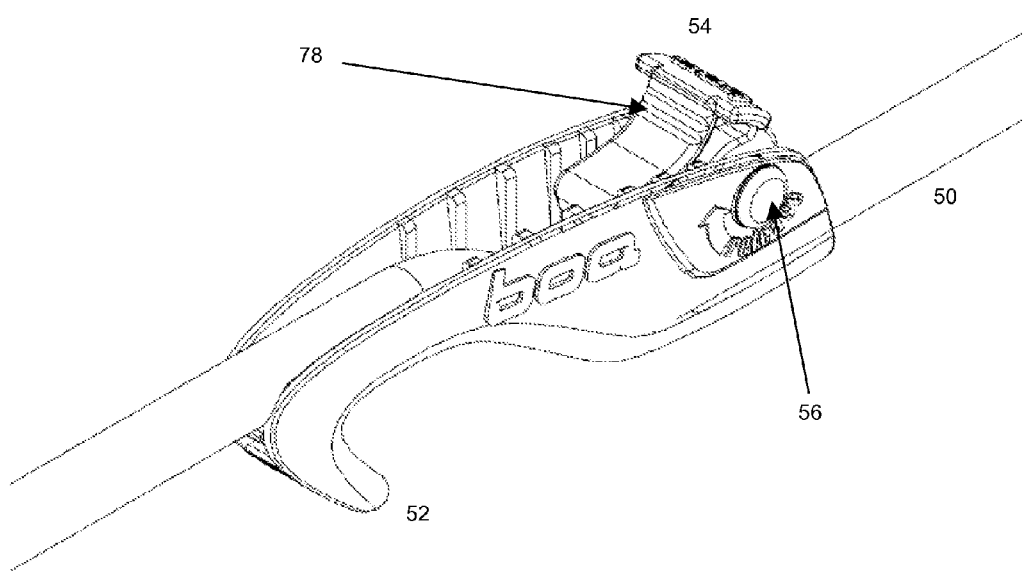
FIG. 3 illustrates a perspective view of a connection mechanism of the adjustable holding device, in accordance with embodiments of the present technology.
Figure 4:
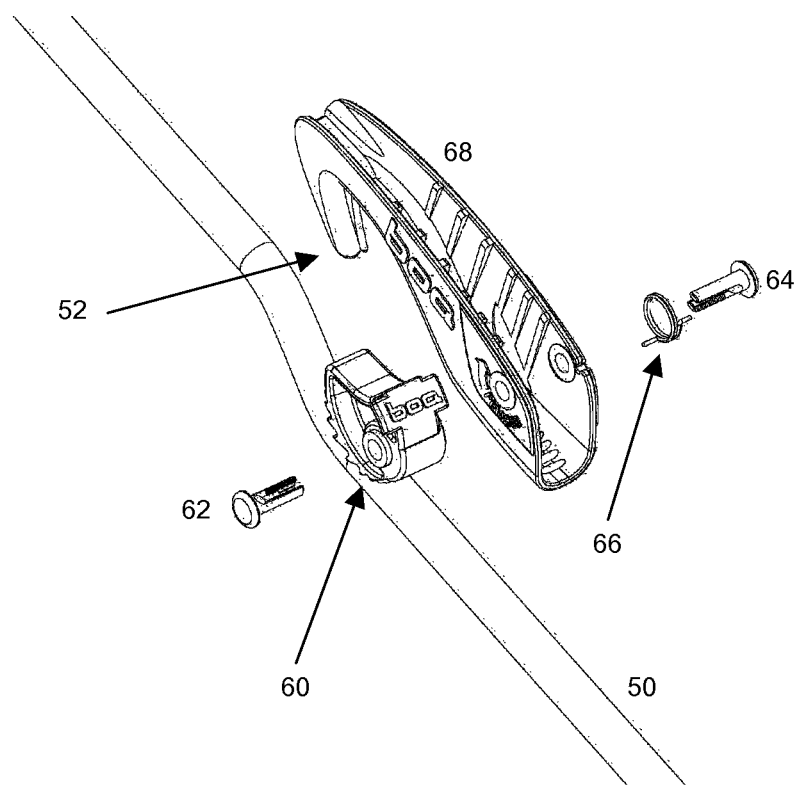
FIG. 4 illustrates an exploded view of a connection mechanism of the adjustable holding device, in accordance with embodiments of the present technology.

FIG. 3 illustrates an embodiment of a connection mechanism in accordance with embodiments of the present technology. The connection mechanism is operatively connected to the elongated cord 50, and includes a hook type connection device 52 together with a cam system 54, which is configured to engage with the elongated cord at a desired location during operation. The connection mechanism further includes a release mechanism 56 which at least in part provides a means for releasing the engagement between the cam system and the elongate cord. FIG. 4 illustrates an exploded view of the connection mechanism of FIG. 3. The connection mechanism includes a housing 68, which has integrated therein the hook type connection device 52. A cam 60, is positioned within the housing 68 and rotatably connected to the housing pins 62 and 64, which are configured to engage each other and provide a location around which the cam 60 can rotate. Integrated with the pins 62 and 64 is a biasing mechanism 66, for example a spring. In some embodiments, the biasing mechanism 66, together with the pins 62 and 64 form at least a portion of the release mechanism which aid in the disengagement of the cam system with the elongate cord. The biasing mechanism 66 in this embodiment may be configured to bias the cam system away from the elongate cord, while the teeth may hold the cam system in place when engaged with the elongate cord. In some embodiments, the biasing mechanism 66, together with the pins 62 and 64, forms at least a portion of an engagement mechanism which biases the cam system toward engagement with the elongate cord.

In some embodiments, biasing action of the biasing mechanism 66 may be adjusted or selectively applied. For example, as illustrated, the biasing mechanism 66 comprises a pin which engages an aperture formed in the housing 68. By forming the aperture within a sub-assembly of the housing, wherein the sub-assembly is rotatable within the housing and lockable into one or more rotary positions, the biasing strength of the pin may be made adjustable. In some embodiments, the spring bias may be changed or reversed, for example by providing a spring which can be removed and replaced by a spring of different strength or opposite bias.

According to some embodiments, the cam system associated with the first connection mechanism, the adjustable connection mechanism or both, is configured to provide a means for a user of the adjustable holding device to enhance the disengagement of the elongate cord by the cam system. For example, the cam system can comprise a depression location which provides a location for the application of pressure by the user for enhancing the disengagement of the elongate cord by the cam system. FIG. 3 illustrates the depression location 78, wherein the application of pressure at this location can at least in part cause the cam to rotate in a direction that results in the disengagement of the cam system with the elongate cord.

Figure 5:
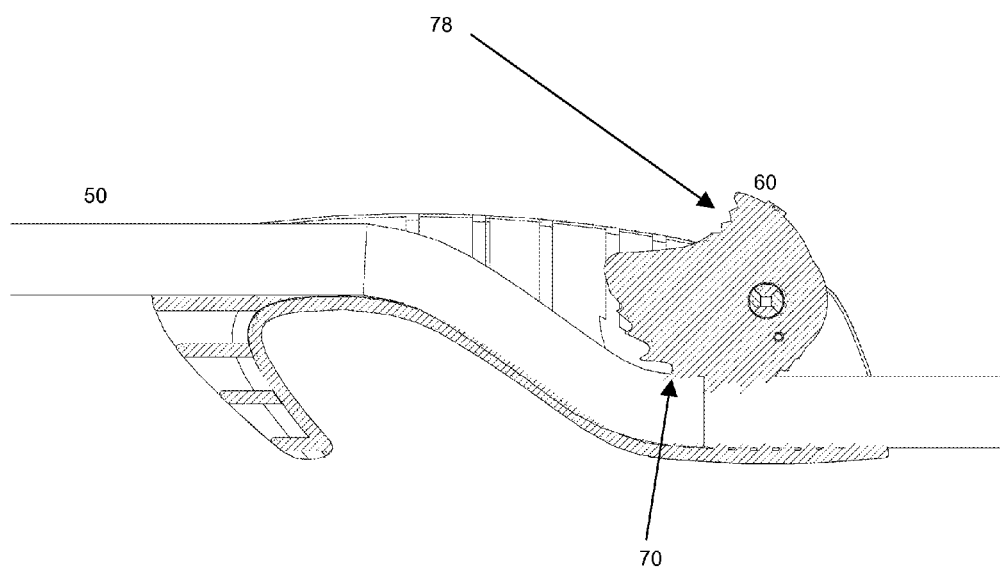
FIG. 5 illustrates a cross sectional view of a connection mechanism in accordance with embodiments of the present technology.

With reference to FIG. 5, a cross section of the connection mechanism illustrated in FIG. 3 is illustrated. In this figure, the cross section of the cam 60 is readily visible including one or more engagement means 70 which are associated with the cam and configured to provide a means for a physical engagement between the cam system and the elongated cord. According to some embodiments, as illustrated in FIG. 5, these engagement means can be configured as teeth, which can span at a portion of the width of the cam. However in other embodiments, these engagement means can be configured as spines, or other projection substantially radially extending from the cam. Other configurations of the engagement means would be readily understood by a worker skilled in the art. According to some embodiments, the engagement means are configured in such a manner that they can releasably engage with the elongate cord.

The teeth or spines may extend at an angle with respect to the cord. For example, as illustrated in FIG. 5, the teeth may be configured so that they bite into the cord at an angle. This angled configuration allows the cord to be substantially freely movable in one direction, namely the direction in which the teeth extend, while limiting motion of the cord in the other direction. This facilitates tightening of the cord by pulling on one end, while retaining cord tension by inhibiting cord motion in the opposite direction. The cam system also results in a variable-width gap through which the cord passes adjacent to the cam, as the cam rotates. This may also facilitate tightening of the cord by pulling, while limiting motion of the cord in the opposite direction once tightened.

In some embodiments, when the cord is under tension, this tension will tend to cause the cord to move past the cam system in a direction opposite to the direction in which the cam system teeth extend. As the cord engages the teeth, this motion induces the cam system to rotate sympathetically with the cord movement, thereby narrowing the gap through which the cord passes adjacent to the cam. As the gap narrows, the cam system tends to inhibit motion of the cord, for example progressively. The cord tension may be due to use of an elastomeric cord or other pressure exerted by objects held in place by the cord between the connection mechanisms.

In some embodiments, the cam system facilitates gripping of the cord for a range of cord diameters, since the width of the gap through which the cord passes adjacent to the cam varies as the cam rotates. The cam system may thereby provide for a clamping action of the cord which, due to the variable width gap, compresses the cord substantially only as much as is necessary for cord retention. The cord diameter may change due to stretching of an elastomeric cord. The cord diameter may additionally or alternatively be changed by changing cords, or by using a tapered cord.

Figure 6:
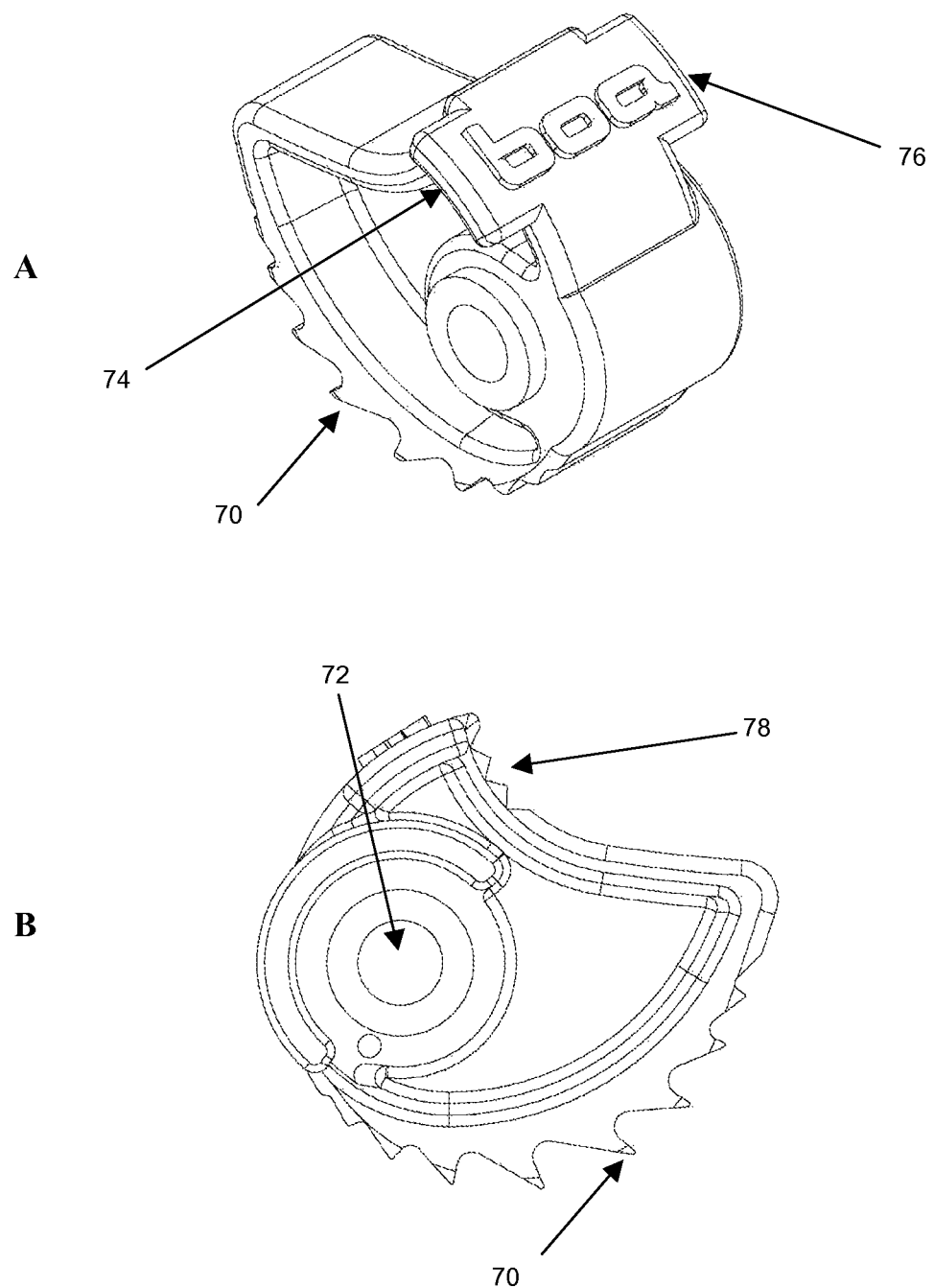
FIG. 6A illustrates a perspective view of a component of a cam system of a connection mechanism of the adjustable holding device, in accordance with embodiments of the present technology.
FIG. 6B illustrates a side view of the component of the cam system illustrated in FIG. 5A.

FIGS. 6A and 6B illustrate the cam in a perspective view and a side view respectively. As illustrated the cam includes a bore 72, through which the pins can pass, thereby enabling the coupling of the cam to the housing. The cam further includes abutments 74 and 76 which provide a means for limiting rotation of the cam by their engagement or contact with the housing of the associated connection mechanism.

According to some embodiments, particularly wherein the cord is elastomeric, the cam system associated with the first connection mechanism, the adjustable connection mechanism or both, is configured to limit tensile loading applied to the elongate elastomeric cord during use. For example, the cam system is configured to discontinue engagement of the elongate elastomeric cord when a reduction in the cross sectional size of cord has reached a predetermined limit, wherein this cross sectional size reduction is at least in part indicative of a desired limit of the tensile load. Furthermore, as illustrated in FIG. 6A, the cam comprises abutments 74 and 76, which upon rotation of the cam a predetermined angle, engage with the housing resulting the limiting of further rotation of the cam. This limitation of the rotation of the cam, thereby limits the degree of tightening of the elongate elastomeric cord to a level of desired operability, for example desired tensile force. As would be readily understood, as a greater tensile force is applied to an elastomeric material, the cross sectional area of this material decreases. Therefore, by appropriately designing the one or more engagement means 70 of the cam and limiting the degree of rotation of the cam, the engagement of the cam system with the elongate elastomeric cord can be mitigated, for example when the cross sectional area of the cord has decreased to a level such that the applied tensile load is above a desired level. Accordingly, the cam system is thereby designed to engage the elongate elastomeric cord when the cord has a cross sectional area greater than a predetermined threshold, but to disengage therefrom when the cord cross sectional area falls below the predetermined threshold due to tension. The predetermined threshold cross sectional area can be correlated to a predetermined tensile force. The predetermined tensile force may be configured to a desired amount by appropriate cam system design. Relevant design parameters may include the elastomeric cord cross-sectional area profile, as a function of tension, elongate cord material or materials, the cam system shape, cam tooth or cam spine size and angle, abutment 74, 76 placement, bias spring strength, and the like.

For example the predetermined tensile force at which the cam system disengages the elastomeric cord may be 65%, 70%, 75%, 80%, 85%, 90% or 95% of the tensile capacity (for example maximum rated capacity) of the elongate elastomeric cord. The selection of the desired tensile force can be dependent on the intended uses or other parameters as would be readily understood, in an attempt to provide a degree of safety during operation.

According to some further embodiments, following disengagement of the cam system due to tension applied to the elastomeric cord, as described above, the cam system may be configured to automatically re-engage if tension in the cord is subsequently relieved to a re-engagement level, which is below the predetermined tensile force. For example, cam system may be configured so that a predetermined portion of its teeth remain in the vicinity of the cord after automatic disengagement, so that, if the cord diameter subsequently increases due to reduced tension, the teeth will begin to catch and hold the cord at a predetermined threshold diameter. For example, in some embodiments the biasing mechanism is configured to bias the cam into an engaged position, thereby providing a means for ease of reengagement of the teeth upon tensile force release and respective increase in the cross sectional size of the elongate cord. The ultimate re-engagement tension level may be lower than the predetermined tensile force, for example due to the requirement to arrest momentum in the elastomeric cord once it has started to retract. If this momentum is arrested by other means, for example by holding one end of the cord and slowly reducing tension, the re-engagement tension level may be higher than if the cord is abruptly released from a high-tension configuration.

In one embodiment, the following procedure can be followed to set the cord tension to the re-engagement level. First, the holding device is installed as desired, for example by connecting the connection mechanisms to desired structures or to each other with the cord wrapped around desired structures, such that the cord tension is below the predetermined tension which would trigger release of the cam system. Tension is then applied to the cord (for example by pulling on an end or other section of the cord) until the cord diameter (or cross-sectional area) falls below the predetermined threshold at which the cam disengages. Tension is then released from the cord, causing the cam to re-engage at the re-engagement level. The re-engagement level may depend on how the tension is released. In some embodiments, if tension is released slowly, the re-engagement level may be higher than if tension is released quickly. By releasing tension at a predetermined rate, a desired re-engagement tension level may be achieved.

In another embodiment, the cam system may be configured to not automatically re-engage the cord after disengagement. For example, a spring may bias the cam system to a disengaged position, so that it will not re-engage the cord until manual intervention.

Some embodiments of the present technology provide for a kit, comprising an adjustable holding device as described herein along with instructions for its use. For example, the instructions may comprise readily understandable and usable instructions for following the above-described procedure. The instructions may additionally or alternatively describe features such as cam disengagement and/or re-engagement, along with their use and the associated rated tension levels.

Figure 7:
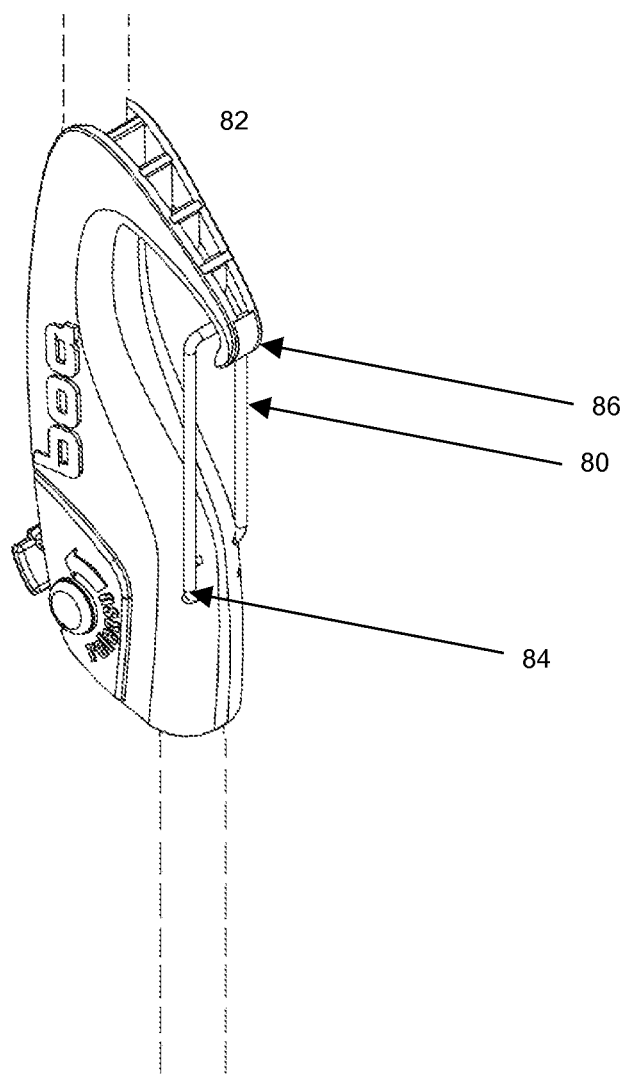
FIG. 7 illustrates a perspective view of a connection mechanism of the adjustable holding device, in accordance with embodiments of the present technology.

According to some embodiments of the present technology, a connection mechanism includes a retention gate in association with a hook type device, which can provide a means for mitigating the possibility of the hook type device from disconnecting with a desired connection point. Thus, the connection mechanism may be a carabiner-type mechanism having characteristics of both a hook and a loop, such as a spring-type carabiner or other type of locking or non-locking carabiner. FIG. 7 illustrates an example a connection mechanism with a retention gate. In this figure, the retention gate 80 is pivotally connected to the housing at a first end and engages with a lip structure 86 associated with the hook type device 82. The lip structure 86 can provide a means for the retention gate 80 from opening in an outward direction relative to the connection mechanism. According to some embodiments, the retention gate further comprises a biasing device which is configured to bias the retention gate 80 into contact with the lip structure 86. In the embodiment illustrated in FIG. 7, the connection mechanism comprises a cam system.

Figure 8:
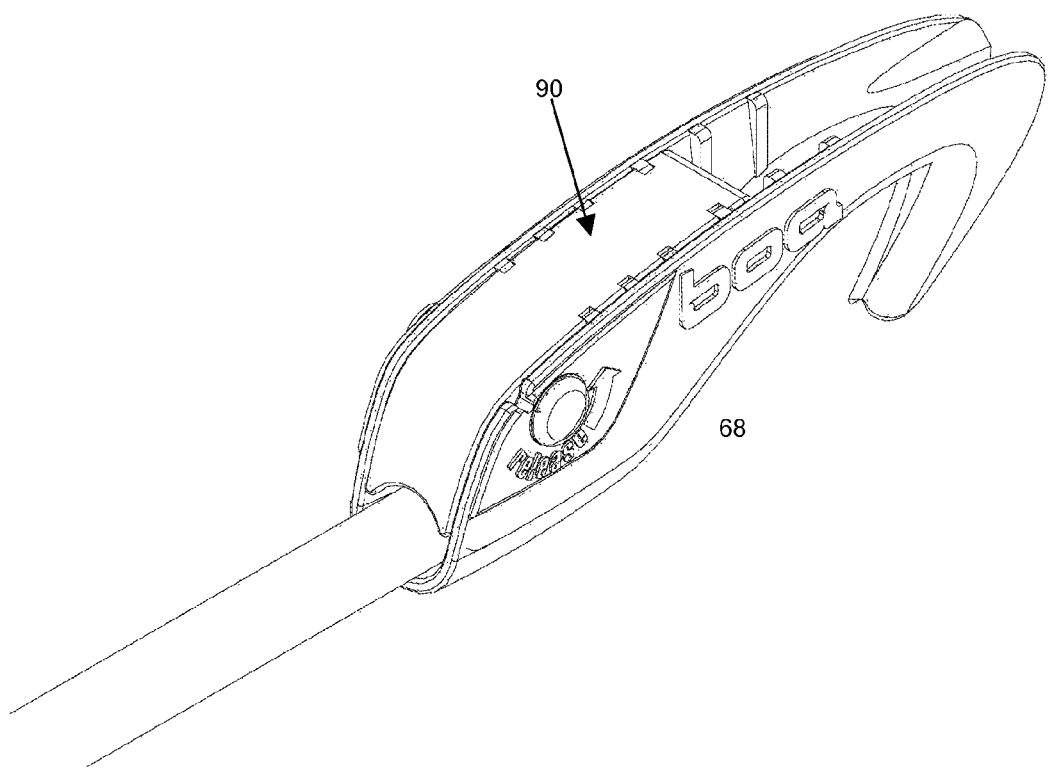
FIG. 8 illustrates a perspective view of a connection mechanism of the adjustable holding device, in accordance with embodiments of the present technology.

According to some embodiments of the present technology, a connection mechanism is configured as a hook type device. An example of this type of configuration is illustrated in FIG. 8, wherein the elongate cord is engaged with the housing of the connection mechanism, thereby coupling the connection mechanism to the cord. In this embodiment, the housing 68 used for the connection mechanism is the same housing configuration that is used for the connection mechanism that includes a cam system.

In some embodiments, as illustrated in FIG. 8, the connection mechanism can include a closure plate 90, which can be configured to matingly connect with the housing of the connection mechanism and enclose the interconnection between the housing and the elongate cord. In these embodiments the housing 68 can be engaged with the elongate cord by various methods. For example the housing can include a plurality of integrated teeth which are configured to embed themselves within the elongate cord upon engagement with the housing 68. As another example, the housing can include a aperture through which the elongate cord is passed and upon the passing of the elongate cord therethrough the elongate cord is doubled over and connected to itself or even a knot can be formed in the elongate cord, thereby increasing the cross section thereof. In this manner this increased cross section can impede the passage of the elongate cord through the aperture. Other means for the interconnection between the elongate cord and the housing 68 would be readily understood by a worker skilled in the art.

Figure 9:
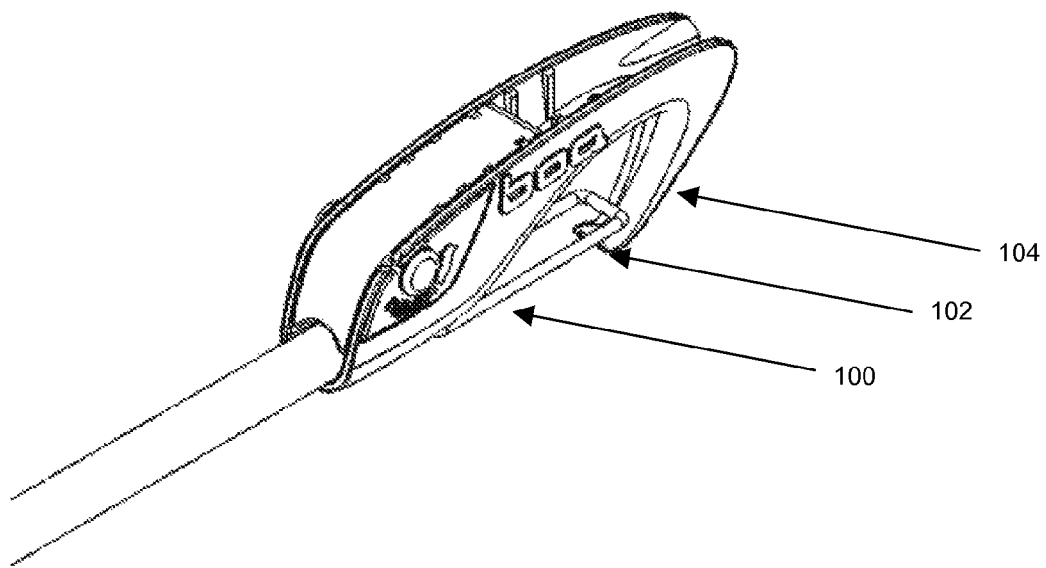
FIG. 9 illustrates a perspective view of a connection mechanism of the adjustable holding device, in accordance with embodiments of the present technology.

According to some embodiments, as illustrated in FIG. 9, a connection mechanism is configured as a hook type device and further include a retention gate 100 is pivotally connected to the housing at a first end and engages with a lip structure 102 associated with the hook type device 104. The lip structure 104 can provide a means for the retention gate 100 from opening in a outward direction relative to the connection mechanism. According to some embodiments, the retention gate further comprises a biasing device which is configured to bias the retention gate 100 into contact with the lip structure 102.

Figure 10:
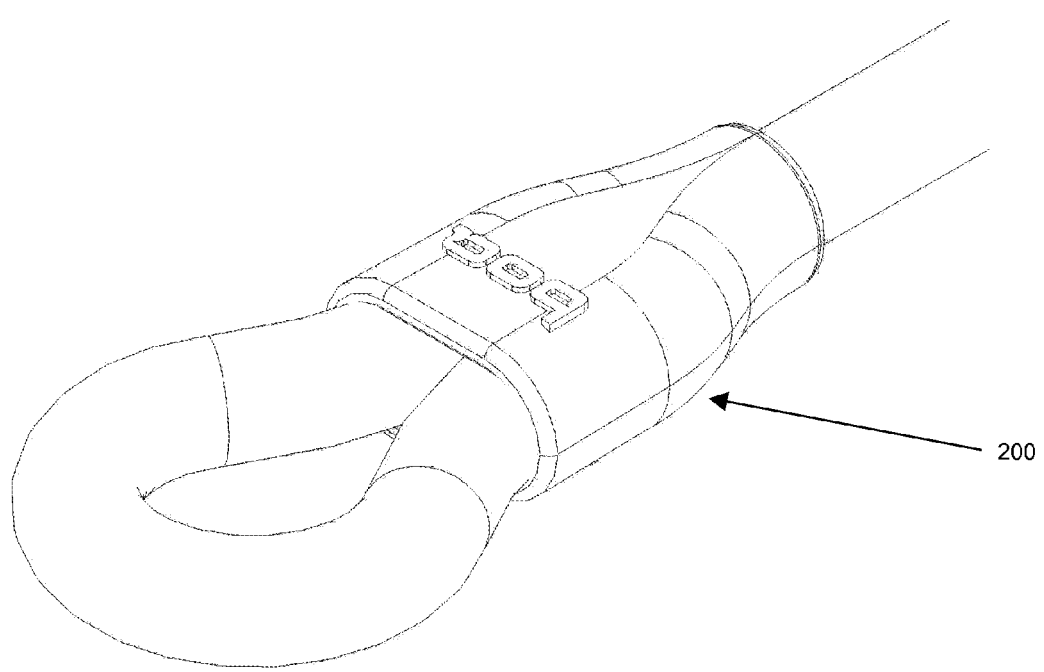
FIG. 10 illustrates a loop end of an elongate cord of the adjustable holding device in accordance with embodiments of the present technology.

According to some embodiments, the first or the adjustable connection mechanism is a loop type connection. In this configuration, a desired connection point can include a form of a loop retention system, for example hook type connection, thereby enabling a connection between the first or adjustable connection mechanism and the desired connection point to be made. An example of a loop type connection is illustrated in FIG. 10, wherein this loop type connection includes a collar 200 which can at least in part be configured to restrain the portion of the elongated cord for the formation of the loop.

Figure 11A:
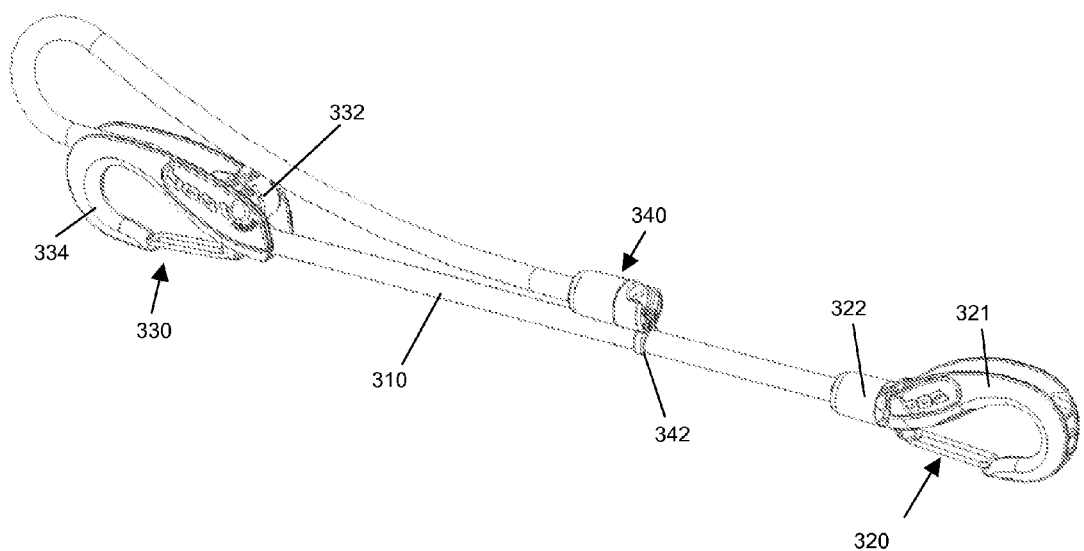
FIG. 11A illustrates a perspective view of an adjustable holding device in accordance with another embodiment of the present technology.
Figure 11B:
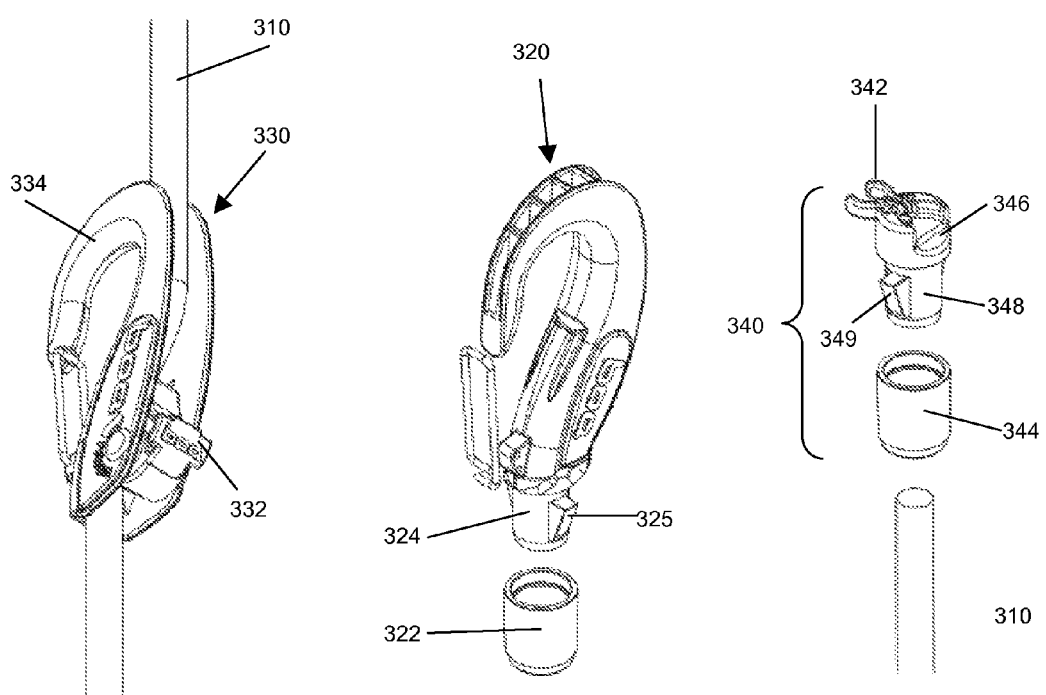
FIG. 11B illustrates details of the adjustable holding device illustrated in FIG. 11A.

FIGS. 11A and 11B illustrate an adjustable holding device in accordance with embodiments of the present technology. The device includes an elongate cord 310 operatively connected to a first connection mechanism 320, an adjustable connection mechanism 330, and an end clip assembly 340.

The first connection mechanism 320 includes a carabiner-style hook type feature 321, which can be used to directly or indirectly connect to desired connection points. The first connection mechanism 320 is configured to grippingly engage an end of the elongate cord 310 as follows. An end portion of the elongate cord 310 is inserted into an aperture formed inside an end portion 324 of the first connection mechanism 320. A collet 322 is slid overtop of the end portion 324, thereby engaging a pivoting grip 325 coupled to the end portion 325. The collet 322 presses the grip 325 into the elongate cord end portion, thereby retaining the end portion within the aperture.

The collet may be held in place via snaps, screw threads, or another retention means. In some embodiments, a swivel may be formed between the end portion 324 and the remainder of the first connection mechanism 320. Other means of attaching an end of the elongate cord 310 to the first connection mechanism 320 may also be used, as would be readily understood to a worker skilled in the art. For example a conical or other suitably shaped aperture with internal gripping mechanisms may be provided in the first connection mechanism, wherein the elongate cord is inserted into the aperture and upon the attempted removal of the elongate cord therefrom the aperture causes the elongate cord to be motivated to engage with the gripping mechanisms, thereby impeding the decoupling of the elongate cord and the first connection mechanism. Another coupling means can include the knotting or doubling over of the elongate cord thereby impeding the passage of the elongate cord through the aperture into which it was inserted in the first connection mechanism.

The adjustable connection mechanism 330 includes a cam system 332, which is configured to engage the elongate cord 310. Detailed operation of the adjustable connection mechanism 330 and cam system 332 are as described elsewhere herein. The adjustable connection mechanism 320 further includes a carabiner-style hook type feature 334, which can be used to directly or indirectly connect to desired connection points.

The end clip assembly 340 is configured for attachment to an end portion of the elongate cord 310, and comprises a clip 342 configured to grippingly engage the elongate cord 310 at a selected portion along its length. For example, the clip 342 may be engaged with a portion of the elongate cord 310 located between the first and adjustable connection mechanisms. In one embodiment, the clip 342 is made of a resilient material and comprises an aperture of the same general shape as the elongate cord's cross section. The elongate cord may be inserted into the clip aperture through a gap formed between two arms of the clip 342. Resilient action of the two arms facilitates gripping of the elongate cord 310 at a selected location. The location of the elongate cord 310 to which the clip 342 is engaged may be selected in order that the elongate cord may be folded back on itself. For example, a portion of the elongate cord, which is not between the first and adjustable connection mechanisms, may be retained adjacent to a portion of the elongate cord which is between the first and second mechanisms. Thus, unused portions of the cord 310 may be secured out of the way. This may result in a cleaner look, retention of a loose end of the cord which may otherwise pose a striking or tripping hazard, or the like, or a combination thereof. The end clip assembly 340 may be engaged to a desired section of the elongate cord after the cord has been tightened by action of the first and adjustable connection mechanisms.

The end clip assembly 340 is configured to grippingly engage an end of the elongate cord 310 as follows. An end portion of the elongate cord 310 is inserted into an aperture formed inside an end portion 348 of a main body 346 of the end clip assembly 340. A collet 344 is slid overtop of the end portion 348, thereby engaging a pivoting grip 349 coupled to the end portion 348. The collet 344 presses the grip 349 into the elongate cord end portion, thereby retaining the end portion within the aperture. The collet 344 may be held in place via snaps, screw threads, or another retention means. In some embodiments, a swivel may be formed between the end portion 348 and the remainder of the main body 346. The two arms of the clip 342 are attached to the main body 346. Other means of attaching an end of the elongate cord 310 to the first connection mechanism 320 may also be used, as would be readily understood to a worker skilled in the art, for example those as previously described in relation to the connection between the first connection mechanism and the elongate cord.

In some embodiments, the end clip assembly may comprise a stowable clip. For example, a cap may be provided which fits over the clip and a portion of the end clip assembly, in order to protect the clip. As another example, the clip may be attached to the end clip assembly via a flexible member such as a hinge or deformable section, and the end clip assembly may further comprise a cavity, such that the end clip may be stowed within the cavity when not in use. Once the end clip is stowed in the cavity, it may optionally be covered by a cap, which may be detachable or attached to the end clip assembly. Stowage of the clip may protect the clip from breakage when not in use.

Although the embodiment illustrated in FIG. 11 comprises a single end clip assembly, other embodiments may comprise two end clip assemblies, each one coupled to a respective end of the elongate cord. At least two connection mechanisms may be provided which engage the elongate cord between the elongate cord ends, using a cam system as described herein.

In some embodiments, the end clip assembly may comprise a stowable clip. For example, a cap may be provided which fits over the clip and a portion of the end clip assembly, in order to protect the clip. As another example, the clip may be attached to the end clip assembly via a flexible member such as a hinge or deformable section, and the end clip assembly may further comprise a cavity, such that the end clip may be stowed within the cavity when not in use. Once the end clip is stowed in the cavity, it may optionally be covered by a cap, which may be detachable or attached to the end clip assembly. Stowage of the clip my protect the clip from breakage when not in use.

The connection mechanisms can be fabricated from a number of different materials or combination of materials depending on the element of the connection mechanism being fabricated. The selection of the material can be determined based on one or a combination of required strength, resistance to wear, weight, cost among other considerations. In some embodiments, portions of a connection mechanism, for example the housing and cam can be manufactured from a suitable plastic, polymer, metal, alloy or other material. According to some embodiments, the housing and the cam of a connection mechanism can be formed from a moulded plastic.

In embodiments, for example as illustrated, a hook, loop, or the like, and a cam system, are integrally formed in a connection mechanism of substantially unitary construction. For example, a single body may form at least part of the hook or loop, and may also form a cavity for mounting parts of the cam system. In some embodiments, a channel may be provided in line with the cam system for receiving the elongate cord and aligning same for engagement with the cam system. For example, the single body of the connection mechanism body may comprise the channel in line with the cavity. The hook or loop may be formed on one side of the connection mechanism body, while the channel and cam system cavity may be formed on an opposite side.

In some embodiments, the channel is shaped so that the elongate cord is guided along one or more channel surfaces. In one embodiment, the channel is substantially S-shaped. In some embodiments, the channel comprises an inlet section and an outlet section which may be substantially parallel, and a connecting section which is disposed at an angle relative to one or both of the inlet section and the outlet section. Thus, the elongate cord is guided through the shaped channel. The cam system may be configured to engage the cord within the connecting section of the channel.

In some embodiments, a plurality of different connection mechanism configurations are manufactured using one or more similar parts. For example, the housing of a connection mechanism can be substantially universal, namely a connection mechanism which includes a cam system can have the same housing configuration as a connection mechanism which is configured as a hook type device. This reduction in the number of specific parts for an adjustable holding device can provide a means for reducing productions cost, as a reduced number of parts specific parts are required for manufacture.

In some embodiments, the elongate cord may be attached via the first connection mechanism, for example tied, to a hanging load such as a boat bumper, and the adjustable (second) connection mechanism may be attached to an anchor point such as a loop mounted to a boat. The length of the elongate cord between the first and adjustable connection mechanisms may then be adjusted by action of the adjustable connection mechanism, as described herein, for example to adjust the boat bumper height.

It is obvious that the foregoing embodiments of the technology are examples and can be varied in many ways. Such present or future variations are not to be regarded as a departure from the scope of the technology, and all such modifications as would be obvious to one skilled in the art are intended to be included within the scope of the following claims.

We claim:

1. An adjustable holding device comprising:
   a) an elongate elastomeric cord having a length and a cross sectional area;
   b) a first connection mechanism operative with the elongate cord;
   c) an adjustable connection mechanism operatively connected to the elongate cord and movable along the length of the cord, the adjustable connection mechanism including a housing and a cam system configured to engage the elongate cord at a desired location, wherein the adjustable connection mechanism is configured to move along the elongate cord when said first connection mechanism and adjustable connection mechanism are operatively connected to desired connection points along the length of the cord; and
   d) the cam system operating as a safety mechanism, the safety mechanism configured to limit rotation of a cam of the cam system rotatable during tensioning movement of the cord, such that the cam system further comprises two abutments which engage with the housing, thereby defining a predetermined threshold for the cross sectional area which correlates to a predetermined tensile force, wherein when an applied tensile force exceeds the predetermined tensile force, the cross sectional area of the elongate elastomeric cord is less than the predetermined threshold thereby disengaging the cam system from the elongate elastomeric cord thus limiting the applied tensile force within the elongate elastomeric cord during use.

2. The adjustable holding device according to claim 1, wherein the first connection mechanism or the adjustable connection mechanism or both include a hook type connection device.

3. The adjustable holding device according to claim 1, wherein the first connection mechanism includes a second cam system configured to engage the elongate elastomeric cord at a second desired location.

4. The adjustable holding device according to claim 1, wherein the first connection mechanism or the adjustable connection mechanism or both include a hook type connection device and a loop type connection.

5. The adjustable holding device according to claim 1, wherein the first connection mechanism or the adjustable connection mechanism or both include a loop type connection.

6. The adjustable holding device according to claim 1, wherein the cam system of the adjustable connection mechanism comprises a release mechanism configured to disengage the adjustable connection mechanism and the elongate elastomeric cord.

7. The adjustable holding device according to claim 6, wherein the release mechanism includes a biasing means configured to bias a cam of the cam system into a disengaged configuration.

8. The adjustable holding device according to claim 1, wherein the cam system of the adjustable connection mechanism includes a biasing means configured to bias the cam of the cam system into an engaged configuration with the elongate elastomeric cord.

9. The adjustable holding device according to claim 1, wherein the cam includes one or more abutments configured to engage a housing of the cam system thereby limiting rotation of the cam.

10. The adjustable holding device according to claim 1, wherein the cam system comprises a depression location defining a location for user application of force for aiding in disengagement of the cam system and the elongate elastomeric cord.

11. The adjustable holding device according to claim 1, further comprising an end clip assembly operatively coupled to an end of the elongate elastomeric cord, the end clip assembly configured to grippingly engage a portion of the elongate elastomeric cord.

12. The adjustable holding device according to claim 1, wherein when the applied tensile force is less than the predetermined tensile force, the safety mechanism is configured to re-engage the cam system with the elongate elastomeric cord.

13. An adjustable connection mechanism for use with an elongate elastomeric cord having a cross section area and the connection mechanism comprising:
   a) a channel for receiving a section of the elongate elastomeric cord;
   b) a cam system disposed within the channel and shiftable between an engaged position and a disengaged position, wherein the cam system is configured to grippingly engage the section of the elongate elastomeric cord when in the engaged position, and wherein the elongate elastomeric cord is moveable along a length thereof through the channel when the cam system is in the disengaged position;
   c) a connection device configured for operatively connecting the connection mechanism to a desired connection point;
   d) an actuation mechanism operatively coupled to the cam system and configured for shifting the cam system between the disengaged position and the engaged position when the connection mechanism is operatively connected to the desired connection point; and
   e) a cam system operating as a safety mechanism, the safety mechanism configured to limit rotation of a cam of the cam system rotatable during tensioning movement of the cord, such that the cam system further comprises two abutments which engage with a housing, thereby defining a predetermined threshold for the cross sectional area which correlates to a predetermined tensile force, wherein when an applied tensile force to the elongate elastomeric cord exceeds the predetermined tensile force, the cross sectional area of the elongate elastomeric cord is less than the predetermined threshold thereby disengaging the cam system from the elongate elastomeric cord thus limiting the applied tensile force to the elongate elastomeric cord during use.

* * * * *